(12) United States Patent
Heitsch et al.

(10) Patent No.: US 10,547,568 B2
(45) Date of Patent: Jan. 28, 2020

(54) NETWORK FOR AN AIRCRAFT OR SPACECRAFT, AND AN AIRCRAFT OR SPACECRAFT INCLUDING SUCH NETWORK

(71) Applicant: Airbus Operations GmbH, Hamburg (DE)

(72) Inventors: Holger Heitsch, Hamburg (DE); Jens Hollander, Hamburg (DE); Daniel Kliem, Hamburg (DE); Martin Wagner, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 43 days.

(21) Appl. No.: 15/347,446

(22) Filed: Nov. 9, 2016

(65) Prior Publication Data
US 2017/0134312 A1    May 11, 2017

(30) Foreign Application Priority Data
Nov. 9, 2015   (EP) .................................... 15193763

(51) Int. Cl.
*H04L 12/861* (2013.01)
*H04L 29/08* (2006.01)
(Continued)

(52) U.S. Cl.
CPC ........ *H04L 49/9057* (2013.01); *H04L 47/826* (2013.01); *H04L 67/12* (2013.01); *H04L 1/0006* (2013.01)

(58) Field of Classification Search
CPC .... H04L 49/9057; H04L 67/12; H04L 47/826
See application file for complete search history.

(56) References Cited

U.S. PATENT DOCUMENTS 6,044,086 A * 3/2000 Albrow ..................... H04J 3/12
370/336
6,279,139 B1    8/2001 Miyasita
(Continued)

FOREIGN PATENT DOCUMENTS

DE  10 2011 076 357 B4   10/2014
EP         1032165 A1     8/2000
(Continued)

OTHER PUBLICATIONS

Extended European Search Report for Application No. 15193751 dated Apr. 22, 2016.
(Continued)

*Primary Examiner* — Walter J Divito
*Assistant Examiner* — Anthony Luo
(74) *Attorney, Agent, or Firm* — Jenkins, Wilson, Taylor & Hunt P.A.

(57) ABSTRACT

A network for an aircraft including a data line and network access devices, a first interface and at least one second interface and connected to the data line via the first interface. Identifiers are assigned to the second interfaces in pairs. The access devices receive and/or transmit data in first data frames having a fixed format and first portion and second portions. The network access devices transmit second data frames and, for each second interface, a sequence of third data frames received on the second interfaces, the network access device including a first processing unit to insert the second data frames in the first portion of the first data frames, split each third data frame into fragment frames, including a part of the respective third data frame and reassembly information allowing regeneration of the third data frame from the fragment frames, and insert the fragment frames into the second portions.

15 Claims, 5 Drawing Sheets

(51) Int. Cl.
*H04L 12/911* (2013.01)
*H04L 1/00* (2006.01)

(56) References Cited

U.S. PATENT DOCUMENTS

| | | |
|---|---|---|
| 7,349,420 B1 | 3/2008 | Toth et al. |
| 8,838,296 B2 | 9/2014 | Fischer et al. |
| 10,389,551 B2 | 8/2019 | Hollander et al. |
| 2003/0210030 A1 | 11/2003 | Korger et al. |
| 2006/0086893 A1 | 4/2006 | Spanier et al. |
| 2008/0123606 A1* | 5/2008 | Takizawa .......... H04W 74/0875 370/338 |
| 2009/0325578 A1* | 12/2009 | Li .................... H04W 36/0055 455/436 |
| 2010/0189006 A1 | 7/2010 | Mallick et al. |
| 2012/0250682 A1* | 10/2012 | Vincent .............. H04L 12/4633 370/390 |
| 2013/0170451 A1* | 7/2013 | Krause ................ H04L 69/14 370/329 |
| 2013/0259049 A1* | 10/2013 | Mizrahi ............... H04J 3/0602 370/392 |
| 2014/0128026 A1 | 5/2014 | Raleigh |
| 2014/0333207 A1 | 11/2014 | Saes |
| 2015/0061587 A1* | 3/2015 | Bruechmann ........ H04B 5/0031 320/108 |
| 2015/0372717 A1 | 12/2015 | Schrum, Jr. et al. |
| 2016/0323312 A1 | 11/2016 | Voelker et al. |
| 2017/0134184 A1 | 5/2017 | Hollander |

FOREIGN PATENT DOCUMENTS

| | | |
|---|---|---|
| EP | 1760563 A1 | 3/2007 |
| EP | 2670098 A1 | 12/2013 |
| EP | 3166258 B1 | 1/2019 |
| WO | WO 2009/081128 A1 | 7/2009 |

OTHER PUBLICATIONS

Extended European Search Report for Application No. 15193763 dated Apr. 25, 2016.
Non-Final Office Action for U.S. Appl. No. 15/346,823 dated Sep. 6, 2018.
Notice of Allowance for U.S. Appl. No. 15/346,823 dated Apr. 12, 2019.

* cited by examiner

NETWORK FOR AN AIRCRAFT OR SPACECRAFT, AND AN AIRCRAFT OR SPACECRAFT INCLUDING SUCH NETWORK

CROSS-REFERENCE TO RELATED APPLICATION

This application claims priority to European Patent Application No. 15193763.8 filed Nov. 9, 2015, the entire disclosure of which is incorporated herein by reference.

TECHNICAL FIELD

The present disclosure relates to a network for an aircraft or spacecraft and to a network arrangement and an aircraft or spacecraft including such a network.

BACKGROUND

In many applications different data networks are provided for transporting different data, which must be kept separate from each other in order to avoid an unwanted influence of one data network on another data network. For example, in aircraft different data networks are used to transport data belonging to different security domains, such as an aircraft control domain, an airline information service domain and a passenger information and entertainment services domain. The aircraft control domain comprises those functions which are absolutely necessary for the operation of the aircraft and for the communication with air traffic control. By contrast, the airline information service domain includes functions which are less relevant to security and are therefore not absolutely necessary, but which are still advantageous for the operation of the aircraft as such. Finally, the passenger information and entertainment services domain includes entertainment and communication functions addressing the passengers directly. The latter functions have no relevance to the safety and operation of the aircraft as such. It must be ensured that, e.g., the functions of the aircraft control domain are never impaired by network entities of the airline information service domain or the passenger information and entertainment services domain.

Due to the fact that in aircraft and spacecraft it is generally highly desirable to keep the extent and complexity of the cabling at a minimum, both in view of weight, costs and maintenance efforts, approaches exist to nevertheless transmit data belonging to different domains or data networks at least partially over a common data line. For example, DE 10 2011 076 357 B4 describes a network in which two network access devices are connected to a common data line. Each network access device comprises multiple data interfaces to which respective data networks transporting data of different priorities are connected. The network access devices transmit the data of the different data networks over the common data line in fixed time slots, wherein multiple data packets from the different data networks are inserted into each of the fixed time slots based on the priorities associated with them in order to be able to guarantee a minimum data transmission rate at least for the highest priority data. The receiving network access device distributes the data packets to the correct data interface based on the priorities of the data packets.

It is desirable to increase the overall bandwidth available for data transmission as much as possible without increasing the complexity of the network structure.

SUMMARY

It is therefore an object of the present disclosure to provide a simple network which is associated with low cabling requirements and provides a high bandwidth. This object is achieved, for example, by features disclosed herein.

According to the present disclosure a network for an aircraft or spacecraft is provided, which comprises at least one data line and at least two network access devices which are connected to the at least one data line such that data is transferable between the at least two network access devices via the at least one data line. For this purpose, each of the network access devices comprises a first interface and at least one second interface and is connected to the at least one data line via the first interface. The interface preferably comprises one or more terminals adapted or configured for connection to one or more wires forming part of the at least one data line. Thus, the network access devices constitute network nodes or entities of the network, optionally together with other devices or entities which are likewise connected to the at least one data line. In case of two or more data lines such other devices or entities may be, e.g., intermediate network devices or entities, such as switches, a master computer and/or a router. With respect to the network access devices the at least one data line constitutes single physical network link.

To each of the at least one second interface of each network access device an identifier is assigned such that for each of the at least one second interface of one of the network access devices one or more of the at least one second interface of one or more of the other network access devices is assigned an associated identifier. Associated identifiers may be identical identifiers or different identifiers assigned to each other at design time of the network or during operation of the network. For example, the network access devices and/or another network entity may be adapted or configured to map identifiers of the second interfaces of the various network access devices to each other. Consequently, in any case, two or more second interfaces of two or more network access devices are associated by their identifiers and form a group, and a corresponding number of separate portions of a data transmission network and/or a corresponding number of external network devices can be connected to the second interfaces of such group to "close" the respective data transmission network via the at least one data line. As will be described in more detail below, data received on a second interface belonging to such group is transmitted to the other second interfaces belonging to the same group. Thus, the identifiers correspond to source and target addresses of second interfaces. In the simplest form there are pairs of second interfaces of different network access devices, which are assigned the same identifier, so that data received on a second interface of one network access device is always transmitted to a particular second interface of another one of the network access devices, namely the one having the same identifier. In any case, the identifiers also identify the respective data transmission network or network device. It is to be noted that there may be more interfaces which are unassigned and which may constitute second interfaces when a data transmission network or network device is connected to them. Similar to the case described above, different or unassociated identifiers may correspond to data transmission networks or network devices, and, thus, data, having different priorities and/or corresponding to different security domains.

The assignment of the identifiers to the second interfaces may be explicit or implicit, e.g., by using an identifier of a data transmission network or network device presently connected to the respective second interface, or by using an identifier included in the data received on the respective second interface, such as an identifier included in the below-described third data packets received on the respective second interface. The identifiers can be assigned to the second interfaces at design time, or can be assigned to the second interfaces manually or automatically when connecting an external data network or network device thereto. Further, it may be desirable to provide for the possibility to reconfigure the assignment and/or the association between the assigned identifiers.

Further, each of the network access devices is adapted or configured to receive and/or transmit data via its first interface, i.e., via the at least one data line, in first data frames having a predetermined fixed or static format or structure. It is to be noted that these first data frame may also be designated as packets depending on the network layer and network type. As will be explained in detail above, they serve as envelope frames for transporting data unrelated data separately via the at least one data line. The fixed format is defined by a predefined protocol having a fixed timing and is preferably selected at design time to match the desired data rates and, in particular, a desired real-time data rate.

Each of the first data frames comprises a first portion and at least one second portion—preferably two or more second portions—following the first portion, i.e., the second portions are arranged after or behind the first portion. The first portion has a predefined first length, each of the second portions has the same predefined second length, and the first and second portions each have a respective predefined location within the first data frame. In other words, when a first data frame is transmitted in a particular period of time filled by the data frame, the first portion and the second portions constitute fixed-length time slots having a fixed location. The first portion is preferably as close to the beginning as possible and most preferably at the beginning, with the exception of address and other management data which may be arranged ahead of it. The first portion and the one or more second portions are arranged successively, i.e., in series or in a row, wherein management or error detection data may be disposed between adjacent ones of these portions. The first portion is the forwardmost of the first and second portions in this series or row of portions.

Each of the network access devices, which is adapted or configured to transmit the first data frames, is adapted or configured to transmit in the first data frames a sequence or plurality of second data frames, which preferably have a fixed length or at least a predefined maximum length, and, for each of the at least one second interface of the respective network access device, a sequence or plurality of third data frames, which are received on the respective at least one second interface and which preferably have a fixed length or at least a predefined maximum length. These network access devices include a first processing unit which is adapted or configured to insert each of the second data frames in their entirety in the first portion of another one of the first data frames, preferably in the order of the sequence of the second data frames. The first processing unit is also adapted or configured to split each third data frame received on the at least one second interface into a plurality of fragment frames, each including, preferably in a payload portion, another part of the respective third data frame and reassembly information, preferably in a header portion, generated by the network access device and allowing another of the network access devices to regenerate the third data frame from the plurality of fragment frames. The reassembly information includes the identifier of the second interface on which the respective third data frame was received and/or the one or more identifiers associated with the identifier of the second interface on which the respective third data frame was received. Thus, it includes one or more identifiers which identify, directly or by way of the association between different identifiers, the source second interface and the second interfaces associated therewith, i.e., the one or more second interfaces to which the third data frames received on the source second interface are to be transferred via the network. Finally, the first processing unit is also adapted or configured to insert each of the fragment frames into another one of the second portions of the first data frames. Consequently, each of the transmitted first data frames includes a second data frame and fragments of one or more third data frames.

Each of the network access devices, which is adapted or configured to receive the first data frames, includes a second processing unit, which may be identical to or separate from the first processing unit if the respective network device is also adapted or configured to transmit first data frames. The second processing unit is adapted or configured to process each received first data frame by extracting the second data frame from the first portion and extracting the fragment frames from the at least one second portion, and to regenerate from the extracted fragment frames the corresponding third data frames in accordance with or by using the reassembly information. The second processing unit is further adapted or configured to output, based on the one or more identifiers included in the respective reassembly information, each regenerated third data frame on the one or more second interfaces to which the one or more identifiers associated with the identifier of the second interface, on which the respective third data frame was received, is assigned. In other words, each network access device having regenerated a third data frame in the above manner determines which of its second interfaces is identified by an identifier associated with the identifier of the second interface on which the respective third data frame was received and outputs the third data frame on the determined second interface or interfaces. This is possible using the reassembly information, as explained above. Therefore, the overall result is a single data stream, data sequence or bit stream on the at least one data line, in which time division multiplexed data of different sources and destinations is transported in a mixed but nevertheless separate manner.

Because each first data frame includes a second data frame having the same length and, thus, may reliably transport the same amount of corresponding payload data, a minimum data rate for these data can be guaranteed. The data transported in the second data frames may, therefore, be real-time data or other data having the highest priority. The third data frames may transport payload data of other external traffic, such as Ethernet-based packet traffic. Due to the fact that each first data frame includes fixed-size second portions in which fragments of the third data frames are transported, the second portions of the first data frames can be filled completely or nearly completely, independent of the size of the third data frames received on the various second interfaces. Therefore, the provision of a minimum data rate for the second data frames is advantageously combined with the provision of a high—and preferably maximum possible—utilization of the first data frames, and, thus, a high—and preferably maximum possible—bandwidth. Further, because the data transport between the second interfaces is based on identifiers assigned to the second interfaces and, thus, based on the configuration of the network access devices, the data transfer may be entirely transparent to the external data networks or network devices connected to the second interfaces.

In a preferred embodiment the first data frames are transported on the at least one data line in predefined time slots having an equal, predetermined length, such that each of the first data frames is transported in a different one of the time slots. It is even more preferred if the time slots are immediately adjacent to each other, so that the entire traffic over the at least one data line is constituted by first data frames, which are then transmitted "back-to-back".

In a preferred embodiment, each of the first data frames includes—preferably in a header portion of the first data frames, which is arranged in front of the first portion—an address portion adapted or configured to contain an address identifying one of the at least one network access device or another network entity connected to the at least one data line. To each of the network access devices an address is assigned, and each of the network access devices is adapted or configured to only receive or process the first data frames including in the address portion the address of the respective network access device, i.e., only the first data frames addressed to it. For this purpose, the first and/or second processing unit may be adapted or configured to determine the address from the address portion of each first data frame arriving at the first interface of the respective network access device and to only process further first data frames having the matching address.

In a preferred embodiment the reassembly information further includes—preferably as a header or in a header portion—a fragment number indicative of the respective part of the respective third data frame and/or a frame number indicative of respective third data frame in the respective sequence of third data frames.

In a preferred embodiment, each of the first processing units and each of the second processing units comprises or is constituted by a field programmable gate array (FPGA). These provide low-cost, fast and secure implementations for the processing units.

In a preferred embodiment the fragment frames—possibly including or together with an error detection code added to it, as explained further below—are of a fixed length which is equal to the length of the second portions. It is particularly preferred if the length of the second portions is 128 Bytes or an integral multiple of 128 Bytes. Preferably, the length of the second portions is smaller than or equal to 512 Bytes. Such small sized of the second portions and the small size of the fragment frames necessitated thereby advantageously allow for a particularly good utilization of the total available data capacity of a first data frame. Furthermore, when the first processing units and/or second processing units comprise or are constituted by a field programmable gate array (FPGA), the fragment frames and the payloads transported by them can be processed in a particularly efficient and fast manner.

In a preferred embodiment, each of the first processing units comprises or is connected to a first buffer memory and is adapted or configured to store in a first buffer memory section of the first buffer memory each of the third data frames received on the at least one second interface and to store each fragment frame in a second memory buffer section of the first buffer memory prior to inserting it in a second portion of a first data frame. The first and second buffer memory sections are preferably fixed and separate address regions of one and the same memory element, but may also be located on physically distinct memory elements. Alternatively or additionally each of the second processing units comprises a second buffer memory and is adapted or configured to store in a first buffer memory section of the second buffer memory each of the first data frames received on the first interface, to store the data included in the extracted fragment frames of third data frames received on different ones of the second interfaces—as determined using the reassembly information, and in particular the one or more identifiers included therein—in different second buffer memory sections of the second buffer memory in an order determined by the reassembly information to thereby regenerate the corresponding third data frames. Again, the first and second buffer memory sections are preferably fixed and separate address regions of one and the same memory element, but may also be located on physically distinct memory elements.

In a preferred embodiment the network access devices are adapted or configured to transmit and/or receive the first data frames as payload of an Ethernet packet or in the form of an Ethernet packet, wherein the first data frames may preferably be Ethernet jumbo frames. This advantageously allows for the utilization of standard Ethernet technology and equipment.

In a preferred embodiment, each of the network access devices further comprises a third interface and is adapted or configured to receive and/or output the second data frames on the third interface. Then, the second data frames are transported in a manner similar to the third data frames in that they are received at an interface of a network access devices and output at an interface of another network access device, so that the network may transport, e.g., real-time data of an external data transmission network having two sections thereof connected to the third interfaces. However, in the alternative it is also possible that the second data frames are generated, processed and used by the respective network access devices themselves. In any case, the third interfaces are preferably assigned identifiers in the same manner as the second interfaces described in detail above, and these identifiers are then associated with each other in the manner likewise described in detail above. Consequently, using the identifiers second data frames received on one third interface are reliably transported to one or more associated third interfaces of one or more other network access devices.

In a preferred embodiment the network further includes a master device which is connected to the at least one data line, and the network access devices are configured as slave devices. The master device is adapted or configured to receive the first data frames transmitted by the network access devices and to selectively transmit to each of the network access devices first data frames addressed to the respective network access device. For this purpose, the first data frames preferably include the address portion mentioned above, wherein an address is assigned to the master device and the first data frames transmitted by the network access devices include the address of the master in the address portion. However, it is also possible that the master device is configured to intercept all first data frames received by it and that no address of the master device is included in the first data frames.

The master device then includes a third processing unit which is adapted or configured to process each received first data frame by extracting the second data frame from the first portion and extracting the fragment frames from the at least one second portion. The extracted second data frames may preferably include data transmitted by the network access devices to the master device and to be processed and used by the master device for interaction and communication with the network access devices. In that case, the second data frame transmitted by the master device in each first data frame to one of the network access devices may preferably include data transmitted by the master device to that network access device and to be processed and used by the network access device for interaction and communication with the master device. In other words, such second data frames may constitute communication between the master device and the network access devices as such, and in accordance with the master-slave principle the master device may poll each slave device by sending second data frames to it and may receive a response by the respective slave device in one or more second data frames. As noted above, the second data frames may advantageously provide for real-time data transmission and real-time communication. Thus, in that case the master device and the network access devices together with the at least one data line constitute an independent data transmission network with independent data communication between the network entities or nodes formed by the master device and the network access devices. By contrast, with respect to this master-slave data transmission network, the third data frames transported in the form of fragment frames on the at least one data line constitute external data traffic belonging to external data transmission networks connected to the second interfaces of the network access devices.

In this embodiment including a master device, the third processing unit is preferably also adapted or configured to determine for each of the extracted fragment frames the one or more identifiers included in the reassembly information of the extracted fragment frames, in order to determine the one or more network access devices having the one or more second interfaces designated by the identifier or identifiers associated with the second interface on which the respective third data frame was received. For this purpose an address in an address portion of the first data frames may also be taken into consideration. The third processing unit is further adapted or configured to generate new first data frames. Each such new first data frame is generated by inserting a second data frame, which may preferably be generated by the master device itself in order to communicate with a respective network access device as noted above, in the first portion of the respective new first data frame, and inserting extracted fragment frames belonging to third data frames addressed to the same network access device into the second portions of the respective new first data frame. The third processing unit is also adapted or configured to transmit each of the generated new first data frames to the network access device to which the third data frames, to which the fragment frames in the second portions of the respective new first data frame belong, are addressed, by addressing the respective new first data frame to the respective network access device, e.g., by including the address of the network access device in an address portion of the new first data frame, as mentioned above.

Thus, it is advantageously possible for each of the network access devices to insert all fragment frames into first data frames regardless of whether they belong to third data frames associated with second interfaces located in different target network access devices. The master device redistributes the fragment frames into first data frames such that each first data frame reaching a network access device only includes fragment frames of third data frames associated with second interfaces of that network access device. In other words, the master device implements a routing function for the fragment frames.

In a preferred embodiment, each of the first processing units is adapted or configured to calculate an error detection code for each of the second data frames, and to then either add the calculated error detection code to the respective second data frame and insert the respective second data frame into the first portion of a first data frame together with the added error detection code or to insert the respective second data frame into the first portion of a first data frame and the calculated error detection code into a first error detection code portion of the first data frame arranged between the first portion and the adjacent second portion. Further, each of the first processing units is also adapted or configured to calculate an error detection code for each of the fragment frames, and to the either add the calculated error detection code to the respective fragment frame and insert the respective fragment frame into a second portion of a first data frame together with the added error detection code or to insert the respective fragment frame into the a second portion of a first data frame and the calculated error detection code into a second error detection code portion of the first data frame immediately after the respective second portion. Similarly, each of the second processing units is adapted or configured to determine for each second data frame extracted from the first portion of a first data frame whether it has been received free of errors using the respective error detection code, and drop the first data frame if the second data frame includes an error, and determine for each fragment frame extracted from a second portion of a first data frame whether it has been received free of errors using the respective error detection code, and to drop the second portion of the first data frame, which includes the fragment frame including an error, and all subsequent second portions of the first data frame. In case of partially or completely dropping a first data frame a retransmission may be requested by the third processing unit. The error detection code may preferably be an Ethernet compliant frame check sequence (FCS), which can be calculated by same generator as the FCS of the entire Ethernet packet or frame constituted by or transporting the first data frame, e.g., a cyclic redundancy check (CRC). In any case, if not inserted into a respective separate error detection code portion, the error detection codes may preferably be appended to the end of the respective second data frame or fragment frame and may then be regarded as a part of the second data frame or fragment frame.

As already explained above, the above-described network is configured to be part of a network arrangement comprising the network and a plurality of external data networks and/or data processing devices, each connected to another one of the at least one second interface of one of the network access devices.

Further, an aircraft or spacecraft comprising such a network or network arrangement is provided by the present disclosure, e.g., a network or network arrangement in an aircraft cabin, such as the network part of a cabin intercommunication and data system (CIDS).

Moreover, the present disclosure also provides a method of transmitting data comprising the steps of providing a network, network arrangement or aircraft or spacecraft having the features of any of the above-described embodiments and of carrying out the various steps described in detail above.

BRIEF DESCRIPTION OF THE DRAWINGS

In the following exemplary embodiments of the disclosure herein will be explained with reference to the drawings.

DETAILED DESCRIPTION

Figure 1:
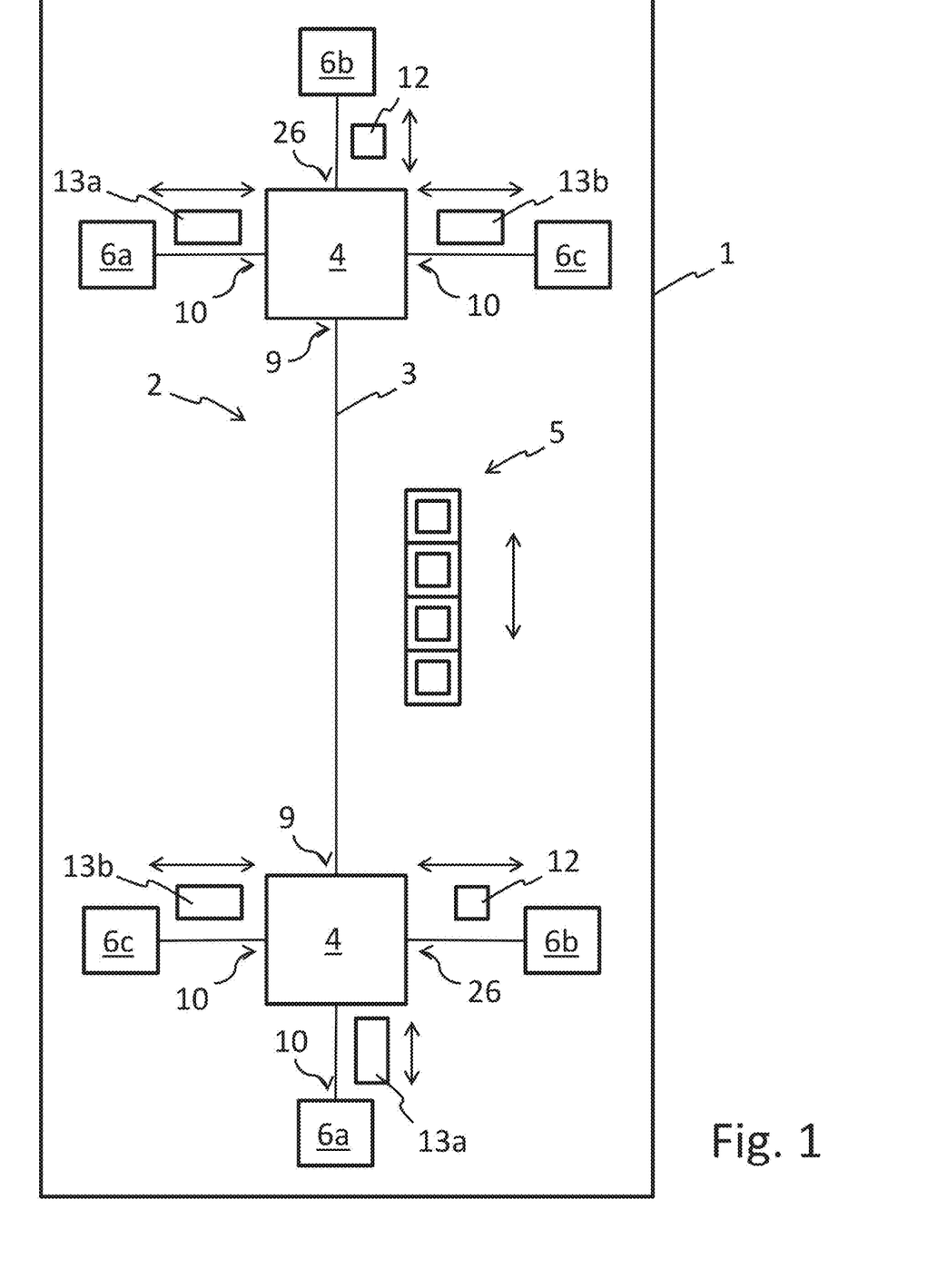
FIG. 1 shows a block diagram of an embodiment of a network and network arrangement according to the present disclosure.

FIG. 1 shows an aircraft 1, in which a network 2 is disposed. The network 2 comprises a data line 3, which may be a data bus and which interconnects two network access devices 4. The network access devices 4 transmit between them first data frames 5 via the data line 3. In the embodiment shown, to each of the network access devices 4 a portion of an external data transmission network or an external network device 6a, 6b, 6c is connected, such that to each of the two network access devices 4 another one of two portions 6a, 6b, 6c such external data transmission networks or another one of two interacting external network devices 6a, 6b, 6c are connected. Thus, as will be explained below, if, e.g., two portions 6a of an external data transmission network are connected to the network access devices 4, the two portions 6a are interconnected via the network access devices 4 and the data line 3, i.e., via the network 2, so that data communication in the external data transmission network to which the two portions 6a belong occurs in part via the network 2. Since the network 2 is shared between all external data transmission networks or network access devices 6a, 6b, 6c, cabling can be reduced.

Figure 4:
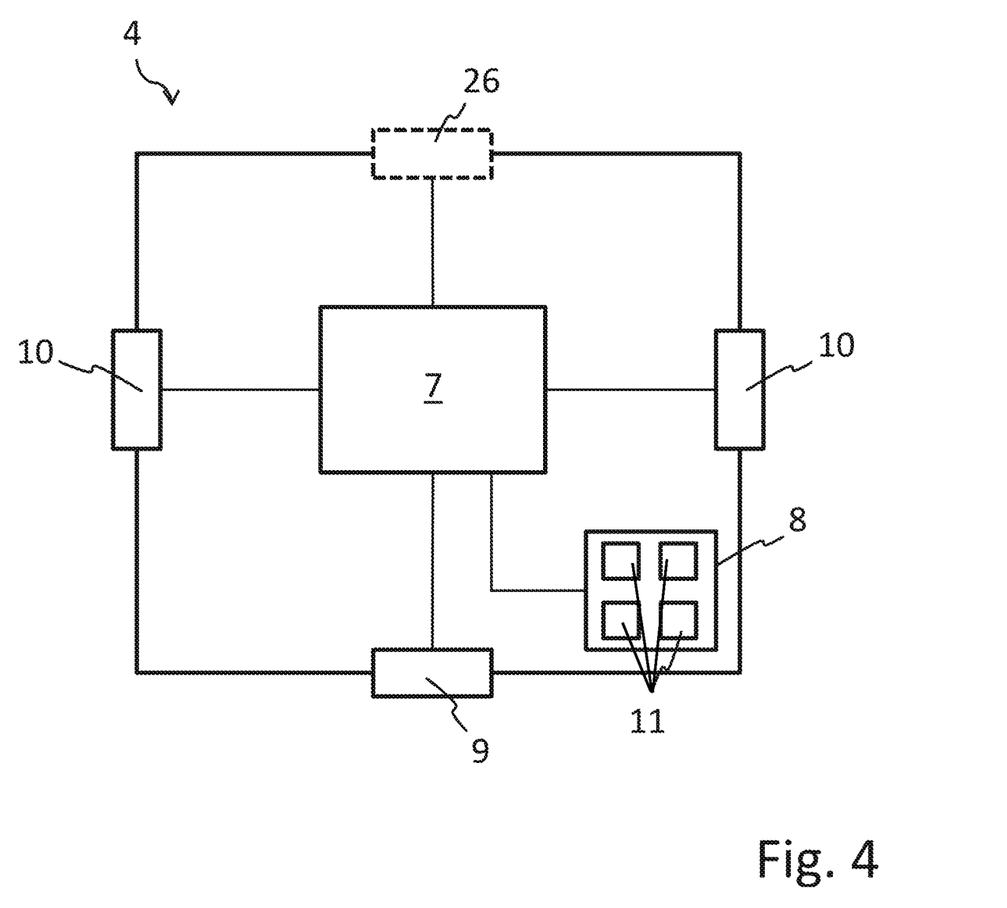
FIG. 4 shows a schematic block diagram of an embodiment of a network access device.

The configuration of the network access devices 4 is schematically shown in FIG. 4. They comprise a processing unit 7, which is connected to a memory device 8, such that the processing unit 7 is able to selectively store data in the memory device 8 and read out data from the memory device 8. Further, the network access device 4 comprises a first interface 9 and two second interfaces 10 and, optionally, a third interface 26, which are likewise connected to the processing unit 7, so that may be received and transmitted by the processing unit 7 via the interfaces 9, 10, 26. The first interface 9 comprises a suitable terminal for coupling to the data line 3, and each of the second and third interfaces 10, 26 comprises a suitable terminal for coupling to the network portions or devices 6a, 6b, 6c, preferably via suitable lines. Each of the second and third interfaces 10, 26 is assigned an identifier uniquely identifying the respective interface 10 in the network 2. It should be noted that such identifier may include a combination of an address of the respective network access device 4 and an identity of the respective second or third interface 10 within the respective network access device 4. The memory device 8 includes different memory portions 11, which can be addressed separately by the processing unit 7 and which may constitute different separate address ranges in a single memory structure. For each of the second interfaces 10 of one network access device 4 one of the second interfaces 10 of the other network access device 4 is assigned the same identifier, thereby associating the two respective second interfaces 10 with each other. In particular, the two second interfaces 10 to which the external data transmission networks or external network devices designated by the reference numeral 6a are connected are assigned an identical identifier, the two second interfaces 10 to which the external data transmission networks or external network devices designated by the reference numeral 6c are connected are assigned a different identical identifier, and the two third interfaces 26 to which the external data transmission networks or external network devices designated by the reference numeral 6b are connected are assigned another different identical identifier.

As illustrated in FIG. 1, each of the network access devices 4 transmits and receives on the second and third interfaces 10, 26 data to and from the network portions or devices 6a, 6b, 6c. These data are transmitted and received in the form of second data frames 12 (in the case of the network portions or devices 6b connected to the third interface 26) and in the form of third data frames 13a and 13b (in the case of the network portions or devices 6a and 6c, respectively, connected to the second interfaces 10). The third data frames 13a, 13b are longer than the second data frames 12 and, as will be explained below, the second data frames 12 transport real-time data with the highest priority among all of the data frames 12, 13a and 13b.

Figure 3:
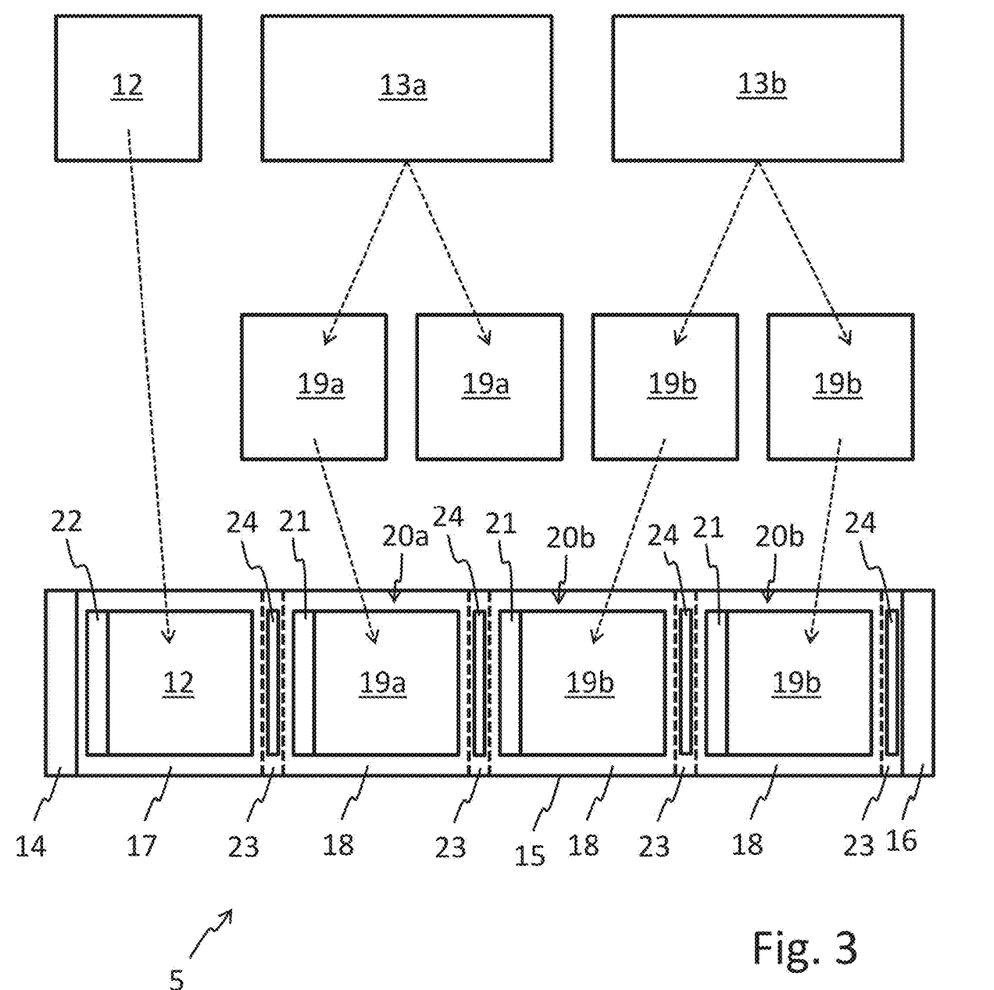
FIG. 3 shows a schematic illustration of a first data frame according to the present disclosure and of how it is constructed.

The network access devices 4 and, in particular, their processing units 7, are adapted or configured to encapsulate in a specific manner the second and third data frames 12, 13a, 13b in the first data frames 5 for transmission over the data line 3 and to regenerate the second and third data frames 12, 13a, 13b from the first data frames 5 upon receipt from the data line 3. This is illustrated in FIG. 3, in which, at the bottom, the structure of the first data frames 5 can be seen.

Generally, each first data frame 5 comprises a header portion 14, a payload portion 15 and an error detection portion 16. In the header portion 14 an address of the originating network access device 4 and of the target network access device 4 may be stored by the processing unit 7 generating the respective first data frame 5, and in the error detection portion 16 an error detection code, such as a CRC code, calculated for the respective first data frame 5 may be stored in order to allow the receiving processing unit 7 to determine whether a transmission error occurred and to request retransmission or partially or completely drop the first data frame 5, if necessary. This general structure of the first data frames 5 corresponds to an Ethernet packet or frame, so that the first data frames 5 and their transmission and processing can be advantageously implemented using Ethernet technology. For example, the first data frames 5 may be jumbo Ethernet frames.

The payload portion 15 is divided into a first portion 17 at the front of the payload portion 15 and multiple second portions 18 arranged in series with the first portion 17. The first portion 17 is of a fixed length and location within the first data frames 5, and all second portions 18 are likewise of a fixed length and location within the first data frames 5, wherein all second portions 18 are of the same length. Between the first portion 17 and the first, adjacent second portion 18 a first error detection portion 23 is disposed, and after each of the second portions 18 an associated second error detection portion 23 is disposed. All error detection portions 23 are of the same length and have a fixed location inside the payload portion 15. Thus, the first data frames 5 have a fixed, static format, which provides a plurality of defined slots 17, 18 for receiving different data of different sources enveloped and transported by the first data frames 5.

For transmission of data, the processing unit 7 of the transmitting network access device 4 is adapted or configured to form a first data frame 5. In this process a second data frame 12 to be transmitted—and which is, e.g., scheduled for transmission in a memory portion 11 of the memory device 8—is inserted into the first portion 17 of the first data frame 5 being formed, and an error detection code 24 calculated by the processing unit 7 for this second data frame 12 is inserted into the associated first error detection portion 23. It should be noted that the second data frame 12 is inserted in its entirety into the first portion 17 and may or may not include a header 22 added to it by the processing unit 7.

Further, in this process the processing unit 7 splits each of the third data frames 13a, 13b, which may be buffered separately for the third data frames 13a and the third data frames 13b received from different ones of the network portions or devices 6a, 6c in associated memory portions 11 of the memory device 8, into respective fragments 19a, 19b. In this regard, the processing unit 7 is adapted or configured to generate and add to each of the fragments 19a, 19b a header 21 including reassembly information allowing a receiving processing unit 7 to reconstruct the original third data frames 13a, 13b from the fragments 19a, 19b. Such reassembly information includes the identifier of the second interface 10 at which the respective third data frame 13a, 13b was received and, thus, also of the second interface 10 to which the respective third data frame 13a, 13b shall be provided at the receiving network access device 4. Each combination of a header 21 and a fragment 19a, 19b constitutes a fragment frame 20a, 20b and is inserted by the processing unit 7 into one of the fixed size second portions 18 of a first data frame 5. Further, an error detection code 24 calculated by the processing unit 7 for each of the fragment frames 20a, 20b is inserted into the associated second error detection portion 23.

Thus, different from the case of the second data frames 12, the third data frames 13a, 13b are not inserted in their entirety into the second portions 18, but rather only fragments thereof. This allows making maximum use of the available data capacity provided by the payload portion 15 of the first data frames 5, thereby advantageously maximizing the transmission bandwidth. It should be noted that the first data frames 5 do not include only fragments 19a, 19b of a single third data frame 13a, 13b or of only third data frames 13a or third data frames 13b. The distribution of the fragments 19a, 19b within a single first data frame 5 or over successive first data frames 5 can be made by the processing unit 7 in accordance with various rules, which may advantageously take into consideration different priorities assigned to the different third data frames 13a, 13b originating from different ones of the network portions or devices 6a, 6c.

Upon receipt of such a first data frame 5 the respective processing unit 7 is adapted or configured to extract the second data frame 12 from the first portion 17, to check for errors using the error detection code 24 from the first error detection portion 23, and to forward the second data frame 12 to the third interface 26 to which the network portion or device 6b is connected. Further, the processing unit 7 is adapted or configured to extract the fragment frames 20a, 20b from the second portions 18, to check for errors using the error detection code 24 from the respective second error detection portions 23, and to store the fragments 19a, 19b included therein, based on the reassembly information extracted from the headers 21, into separate memory portions 11 of the memory device 8, depending on the target second interface 10. Thus, inside the memory portions 11 the third data frames 13a and the third data frames 13b are reassembled separately from each other to avoid any possibility of an undesired interaction between the different data streams.

Figure 2:
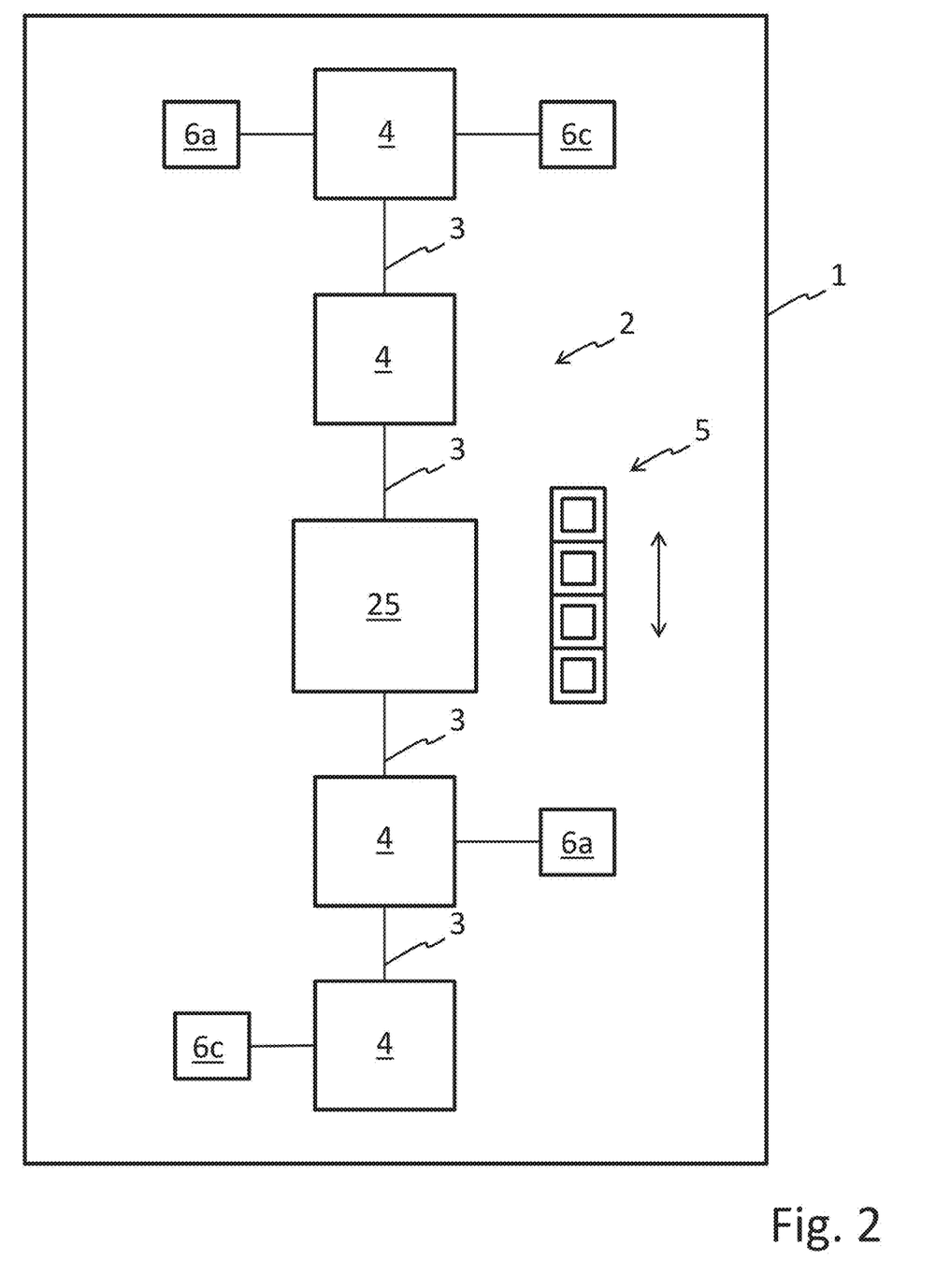
FIG. 2 shows a block diagram of another embodiment of a network and network arrangement according to the present disclosure.

In a further embodiment schematically shown in FIG. 2, the network 2 includes, in addition to the two network access devices 4 of FIG. 1 two further network access devices 4 and a master device 25. The network access devices 4, which are configured as slave devices, and the master device 25 are arranged in series in a daisy-chain configuration with a section of the data line 3 between each two adjacent devices 4, 25. In this embodiment, the third interface 26 of the network access devices 4 is not adapted or configured to receive second data frames 12, but to receive and transmit first data frames 5, either to and from the master device 25 or to and from an adjacent device 4, 25 in order to forward first data frames 5 not addressed to the respective network access device 4 along the daisy-chain arrangement.

Figure 5:
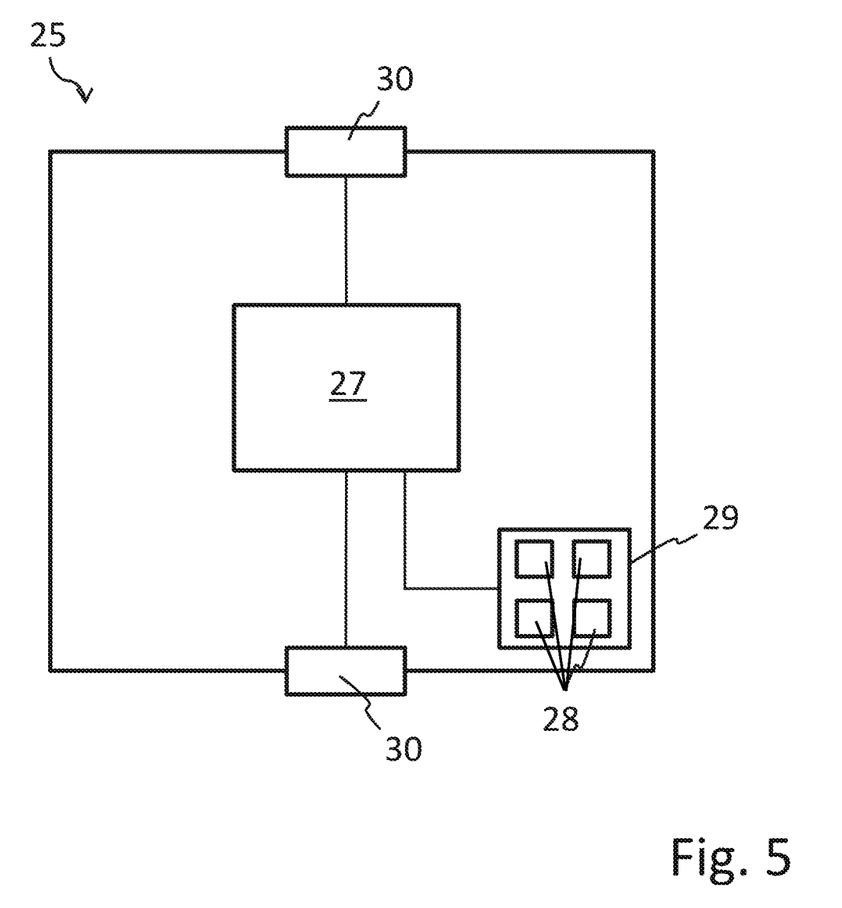
FIG. 5 shows a schematic block diagram of an embodiment of a master device.

As schematically illustrated in FIG. 5, the master device 25 includes two master interfaces 30, preferably including one or more terminals, for coupling to the data line 3, a processing unit 27, and a memory device 29 including multiple separate memory portions 28, which can be addressed separately by the processing unit 27 and which may constitute different separate address ranges in a single memory structure, wherein the processing unit 27 is connected to each of the interfaces 30 and the memory device 29.

Different from the embodiment shown in FIG. 1, in the network 2 of FIG. 2 the second data frames 12 are not output to external network portions or devices 6b, but are transmitted in the first data frames 5 from the master device 25 to the slave devices 4 and processed therein and received by the master device 25 from the slave devices 4. In this regard, the master devices 25 transmits the first data frames 5 as polling messages to the slave devices 4, and the slave devices 4 respond with first data frames 5. These polling and response first data frames 5 and, in particular, the second data frames 12 included therein establish real-time communication in a master-slave network constituted by the master device 25 and the slave devices 4.

At the same time, in the manner described above, the first data frames 5 also transport external data associated with the external network portions or devices 6a, 6c in the form of fragment frames 20a, 20b. Because the uppermost network access device 4 in FIG. 2 is connected to both external network portions or devices 6a, 6c, so that the first data frames 5 generated and transmitted by it include fragment frames 20a, 20b belonging to the two types of third data frames 13a, 13b, whereas the two lowermost network access devices 4 in FIG. 2 are each only connected to a single one of the external network portions or devices 6a, 6c, so that first data frames 5 addressed to them must only include either fragment frames 20a belonging to the third data frames 13a or fragment frames 20b belonging to the third data frames 13b, the processing unit 27 of the master device 25 is providing a router function. In this regard, received first data frames 5 are disassembled in the above manner, wherein the processing unit 27 is adapted or configured to extract the fragment frames 20a, 20b from the second portions 18, to check for errors using the error detection code 24 from the respective second error detection portions 23, and to store the fragments 19a, 19b included therein, based on the reassembly information extracted from the headers 21, into separate memory portions 28 of the memory device 29, depending on the target second interface 10. Thus, inside the memory portions 28 the third data frames 13a and the third data frames 13b are reassembled separately from each other to avoid any possibility of an undesired interaction between the different data streams. The first data frames 5 to be transmitted by the master device 25 are generated such that they include only fragment frames 20a, 20b of third data frames 13a, 13b associated with second interfaces 10 present in the target network access device 4.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A network for an aircraft or spacecraft, comprising:
   at least one data line; and
   at least two network access devices, each comprising a first interface and at least one second interface and being connected to the at least one data line via the first interface, such that data are transferable between the at least two network access devices via the at least one data line, wherein an identifier is assigned to each of the at least one second interface such that for each of the at least one second interface of one of the network access devices at least one of the at least one second interface of at least one of the other network access devices is assigned an associated identifier;
   wherein each of the network access devices is configured to receive or transmit data, or both receive and transmit data, via its first interface in first data frames having a predetermined fixed format, wherein each of the first data frames comprises a first portion and at least one second portion following the first portion, the first portion having a predefined first length, each of the second portions having a same predefined second length, and the first and second portions each having a respective predefined location within the first data frame;
   wherein the first portion and the at least one second portion are encapsulated in the first data frames;

wherein:
   each of the network access devices configured to transmit the first data frames is configured to transmit in the first data frames a sequence of second data frames and, for each of the at least one second interface of a respective network access device, a sequence of third data frames received on a respective at least one second interface, wherein the network access device includes a first processing unit configured to:
      insert each of the second data frames in the first portion of another one of the first data frames;
      to split each third data frame received on the at least one second interface into a plurality of fragment frames, each including another part of a respective third data frame and reassembly information generated by the network access device and allowing another of the network access devices to regenerate the third data frame from the plurality of fragment frames, wherein the reassembly information includes at least one identifier which is the identifier of the second interface on which the respective third data frame was received or the at least one identifier associated with the identifier of the second interface on which the respective third data frame was received; and
      to insert each of the fragment frames into another one of the second portions of the first data frames; and
   each of the network access devices configured to receive the first data frames including a second processing unit configured to:
      process each received first data frame by extracting the second data frame from the first portion and extracting the fragment frames from the at least one second portion;
      regenerate from the extracted fragment frames the corresponding third data frames; and
      based on the at least one identifier included in respective reassembly information, transmit each regenerated third data frame on the at least one second interface to which the at least one identifier associated with the identifier of the second interface, on which the respective third data frame was received, is assigned; and
   wherein at least the second data frames are Ethernet frames.

2. The network according to claim 1, wherein the first data frames are transported on the at least one data line in predefined time slots having an equal, predetermined length, such that each of the first data frames is transported in a different one of the time slots.

3. The network according to claim 1, wherein each of the first data frames includes an address portion configured to contain an address identifying one of the at least one network access device or another network entity connected to the at least one data line, and wherein to each of the network access devices an address is assigned, and each of the network access devices is configured to only receive the first data frames including in the address portion the address of the respective network access device.

4. The network according to claim 1, wherein the reassembly information further includes a fragment number indicative of a respective part of the respective third data frame or a frame number indicative of the respective third data frame in a respective sequence of third data frames.

5. The network according to claim 1, wherein each of the first processing units and each of the second processing units comprises a field programmable gate array (FPGA).

6. The network according to claim 1, wherein the fragment frames are of a fixed length which is equal to a length of the second portions.

7. The network according to claim 6, wherein the length of the second portions is 128 Bytes or an integral multiple of 128 Bytes.

8. The network according to claim 1, wherein:
each of the first processing units comprises or is connected to a first buffer memory and is configured to store in a first buffer memory section of the first buffer memory each of the third data frames received on the at least one second interface and to store each fragment frame in a second memory buffer section of the first buffer memory prior to inserting it in a second portion of a first data frame; or
each of the second processing units comprises a second buffer memory and is configured to store in a first buffer memory section of the second buffer memory each of the first data frames received on the first interface, to store the data included in the extracted fragment frames of third data frames received on different ones of the second interfaces in different second buffer memory sections of the second buffer memory in an order determined by the reassembly information to thereby regenerate the corresponding third data frames.

9. The network according to claim 1, wherein the network access devices are configured to transmit or receive, or both transmit and receive, the first data frames as payload of an Ethernet packet or in the form of an Ethernet packet.

10. The network according to claim 1, wherein each of the network access devices further comprises a third interface and is configured to receive or transmit, or both receive and transmit, the second data frames on the third interface.

11. The network according to claim 1, further including a master device connected to the at least one data line, wherein the network access devices are configured as slave devices and the master device is configured to receive the first data frames transmitted by the network access devices and to selectively transmit to each of the network access devices first data frames addressed to the respective network access device, and wherein the master device includes a third processing unit which is configured to:
process each received first data frame by extracting the second data frame from the first portion and extracting the fragment frames from the at least one second portion;
determine for each of the extracted fragment frames the at least one identifier included in the reassembly information of the extracted fragment frames, in order to determine the at least one network access device having the at least one second interface designated by the at least one identifier associated with the second interface on which the respective third data frame was received;
generate new first data frames, wherein each new first data frame is generated by:
inserting a second data frame in the first portion of the respective new first data frame;
inserting extracted fragment frames belonging to third data frames addressed to the same network access device into the second portions of the respective new first data frame; and
outputting each of the generated new first data frames such that it is addressed to the network access device to which the third data frames, to which the fragment frames in the second portions of the respective new first data frame belong, are addressed.

12. The network according to claim 1, wherein each of the first processing units is configured to:
calculate an error detection code for each of the second data frames, and either:
add the calculated error detection code to the respective second data frame, and insert the respective second data frame into the first portion of a first data frame together with the added error detection code; or
insert the respective second data frame into the first portion of a first data frame and the calculated error detection code into a first error detection code portion of the first data frame arranged between the first portion and the adjacent second portion; and
calculate an error detection code for each of the fragment frames, and either:
add the calculated error detection code to the respective fragment frame, and insert the respective fragment frame into a second portion of a first data frame together with the added error detection code; or
insert the respective fragment frame into the a second portion of a first data frame and the calculated error detection code into a second error detection code portion of the first data frame immediately after the respective second portion; and
each of the second processing units is configured to:
determine for each second data frame extracted from the first portion of a first data frame whether it has been received free of errors using the respective error detection code, and drop the first data frame if the second data frame includes an error; and
determine for each fragment frame extracted from a second portion of a first data frame whether it has been received free of errors using the respective error detection code, and to drop the second portion of the first data frame, which includes the fragment frame including an error, and all subsequent second portions of the first data frame.

13. A combination network comprising:
the network according to claim 1; and
a plurality of external data networks or data processing devices, each connected to another one of the at least one second interface of one of the network access devices.

14. An aircraft or spacecraft comprising the combination network according to claim 13.

15. An aircraft or spacecraft comprising the network according to claim 1.

* * * * *